(12) United States Patent
Urquhart et al.

(10) Patent No.: US 11,708,300 B2
(45) Date of Patent: Jul. 25, 2023

(54) SYSTEM FOR PROVIDING MARKED CONTAINERS AND METHOD THEREOF

(71) Applicant: NUOVA OMPI S.R.L., Padua (IT)

(72) Inventors: Tod Urquhart, Padua (IT); Mauro Longo, Padua (IT)

(73) Assignee: NUOVA OMPI S.R.L., Padua (IT)

( * ) Notice: Subject to any disclaimer, the term of this patent is extended or adjusted under 35 U.S.C. 154(b) by 604 days.

(21) Appl. No.: 16/633,612

(22) PCT Filed: Oct. 17, 2018

(86) PCT No.: PCT/IB2018/058058
§ 371 (c)(1),
(2) Date: Jan. 24, 2020

(87) PCT Pub. No.: WO2019/077524
PCT Pub. Date: Apr. 25, 2019

(65) Prior Publication Data
US 2020/0207501 A1    Jul. 2, 2020

(30) Foreign Application Priority Data

Oct. 20, 2017   (IT) .......................... 102017000119131

(51) Int. Cl.
*C03C 17/00*          (2006.01)
*B41J 3/407*          (2006.01)
(Continued)

(52) U.S. Cl.
CPC ........... *C03C 17/005* (2013.01); *B41J 3/4073* (2013.01); *B41J 11/002* (2013.01);
(Continued)

(58) Field of Classification Search
CPC ..... C03B 17/005; C03B 17/22; C03C 17/005; C03C 17/22
See application file for complete search history.

(56) References Cited

U.S. PATENT DOCUMENTS

2004/0217993 A1   11/2004  Itoh
2006/0099334 A1*   5/2006  O'Brien ............... G01N 29/041
                                              427/163.1
(Continued)

FOREIGN PATENT DOCUMENTS

DE   102014117199 A1 *  5/2016  ........... C03C 17/003
GB        2107614 A  *  5/1983  ......... B05B 13/0442
(Continued)

*Primary Examiner* — Cynthia Szewczyk
(74) *Attorney, Agent, or Firm* — ArentFox Schiff LLP; Michael Fainberg

(57) ABSTRACT

System for providing marked containers comprising a computerised control system storing at least one unique identifier for each container, to be applied to a respective container, a printing unit comprising an ink delivery station, operatively connected with said computerised control system, able to print said identifier on each container, comprising a printing head filled with ink and having a plurality of nozzles configured for spraying said ink on an external surface of each container, displacement means able to perform a relative rotation, translation or rotary translation between each container and the printing head during the printing of the identifier on the container, said displacement means being operatively connected with said computerised control system.

13 Claims, 3 Drawing Sheets

(51) Int. Cl.
*B65B 3/00* (2006.01)
*B65B 55/04* (2006.01)
*B65B 57/06* (2006.01)
*B65B 61/02* (2006.01)
*B65B 61/26* (2006.01)
*C03C 17/02* (2006.01)
*B41J 11/00* (2006.01)

(52) U.S. Cl.
CPC ........... *B41J 11/0022* (2021.01); *B65B 3/003* (2013.01); *B65B 55/04* (2013.01); *B65B 57/06* (2013.01); *B65B 61/025* (2013.01); *B65B 61/26* (2013.01); *C03C 17/02* (2013.01); *C03C 2218/119* (2013.01); *C03C 2218/32* (2013.01)

(56) References Cited

U.S. PATENT DOCUMENTS

2008/0055348 A1* 3/2008 Deeter ................... B41J 3/4073
347/107
2009/0130395 A1* 5/2009 Lyon ..................... C03C 17/001
427/256

FOREIGN PATENT DOCUMENTS

| WO | WO-9919074 A1 * | 4/1999 | ............... B05C 9/14 |
| WO | 0061301 A1 | 10/2000 | |
| WO | 2008039284 A2 | 4/2008 | |
| WO | 2017157784 A1 | 9/2017 | |

* cited by examiner

SYSTEM FOR PROVIDING MARKED CONTAINERS AND METHOD THEREOF

CROSS-REFERENCE TO RELATED APPLICATIONS

This application is a National Phase Application of PCT International Application No. PCT/IB2018/058058, having an International Filing Date of Oct. 17, 2018 which claims priority to Italian Application No. 102017000119131 filed Oct. 20, 2017, each of which is hereby incorporated by reference in its entirety.

TECHNICAL FIELD

The present invention relates to a system for providing marked containers, preferably for pharmaceutical use, and the method thereof.

BACKGROUND ART

As well known, the marking of cylindrical glass containers with identifier codes, which allow the identification of containers, can occur by means of a sort of fixed matrix and a printing head or a printing system, which is able to print the same specific mark on each container.

This solution is fast but it is only able to print always the same image/logo for each container. In order to change the mark, it is necessary to dismantle the head and to substitute the fixed matrix.

This operation does not allow changing the logo/mark and marking the containers with a unique identifier. Therefore, the information carried out by each mark has to be the same.

This is a great limitation in terms of information which can be applied to each container, since the information is fixed and limited and it cannot be changed for each subsequent container. Especially in the pharmaceutical industry, which has the need to perform the verification and tracking and tracing of the containers, each container must be necessarily marked with a unique identifier or serial number This technical problem is even increased in the pharmaceutical field wherein a special ink has to be used and the surface of the containers to be printed is curved.

As to the ink, an inorganic ink needs to be used in order to withstand to sterilization, depyrogenation and high temperatures for tempering steps of the glass containers.

Moreover, the ink has not to damage the glass containers and/or their content (pharmaceutical compound).

Moreover, in the pharmaceutical field the printing step of image/logo on each container has to match with the high speed production and forming line of the glass containers: therefore the printing of each container has not to slow the upward production/forming line of the glass containers.

The known printing processes are relatively fast when printing static images, but they cannot print unique identifiers or serial numbers as this requires a new printing image for very container.

SUMMARY OF THE INVENTION

In view of the above, it is felt in the art the need to overcome these drawbacks, by providing a system which is able to mark cylindrical glass containers with a unique identifier code like, for example, a data matrix 2D barcode or a 2D QR barcode or as human readable text, in a very fast, precise and reliable way by using existing digital printing systems which can be integrated in glass containers forming and manufacturing lines.

Such aim is reached by the system for providing glass marked containers according to claim 1.

Other embodiments of invention are described in remaining dependent claims.

BRIEF DESCRIPTION OF THE DRAWINGS

Further characteristics and advantages of the present invention will be more clearly comprehensible from the description given below of its preferred and non-limiting embodiments, wherein.

The elements or parts of elements common to the embodiments described below will be indicated using the same reference numerals.

DETAILED DESCRIPTION

Figure 1:
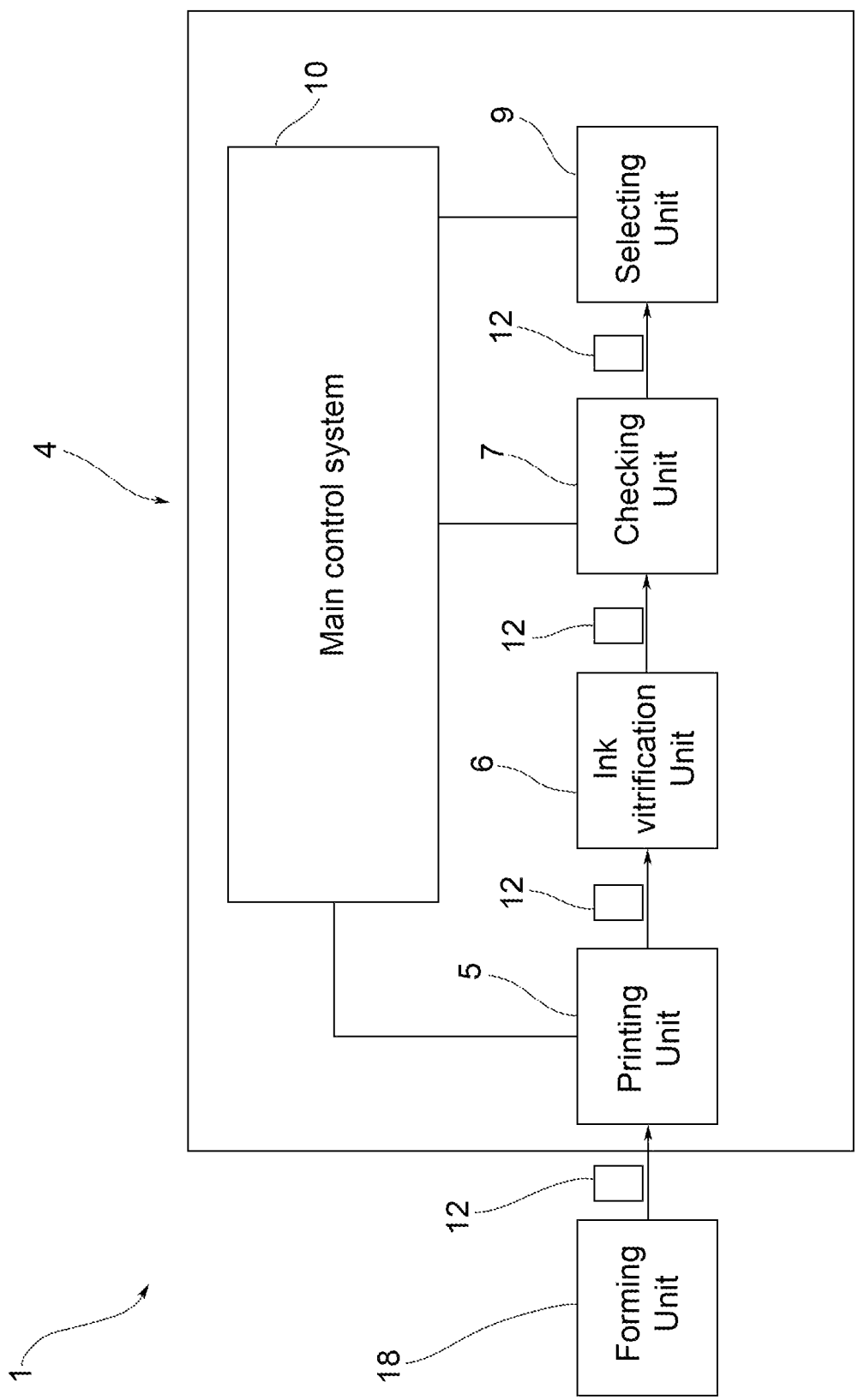
FIG. 1 shows a sketch view of the system for providing marked containers according to an embodiment of the present invention.

FIG. 1 shows a containers manufacturing line 1, comprising a container forming station 18 and a system 4 for providing marked containers 12, preferably for pharmaceutical use.

The current invention is not related to a specific type or size or shape of a glass container Therefore the kind of drug the size and/or material of the containers can be of different types and do not affect or limit the scope of protection of the invention.

The drug that can be stored may be both liquid and solid, like pills or powder.

Moreover, the present invention is not limited to pharmaceutical field. Moreover, marked containers 12 are preferably glass containers 12.

The system 4 for providing marked containers 12, comprises a printing unit 5, an ink vitrification unit 6, a marked container checking unit 7, a selecting unit 9 for accepting/rejecting the marked containers, and a main control system 10, operatively connected with the printing unit 5, the ink vitrification unit 6, the marked container checking unit 7 and the selecting unit 9.

The printing unit 5, preferably a digital printing unit, is configured to print an identifier 16 on each container 12 exiting the forming station 18, in particular on an external surface of each container 12.

The ink vitrification unit 6 is configured to bond the ink used to print the identifier 16 on the on an external surface of each container 12.

The marked container checking unit 7 is configured to check and evaluate the quality of the printed identifier 16.

The selecting unit 9 is configured to accept or reject the marked container exiting the checking unit on the base of the results of the evaluation performed by the container checking unit 7.

The main control system 10 is configured to manage and control the functionality of the units 5, 6, 7 and 9.

The main control system 10 may also be configured for receiving and transferring data from/to external or third party computer systems.

Figure 2:
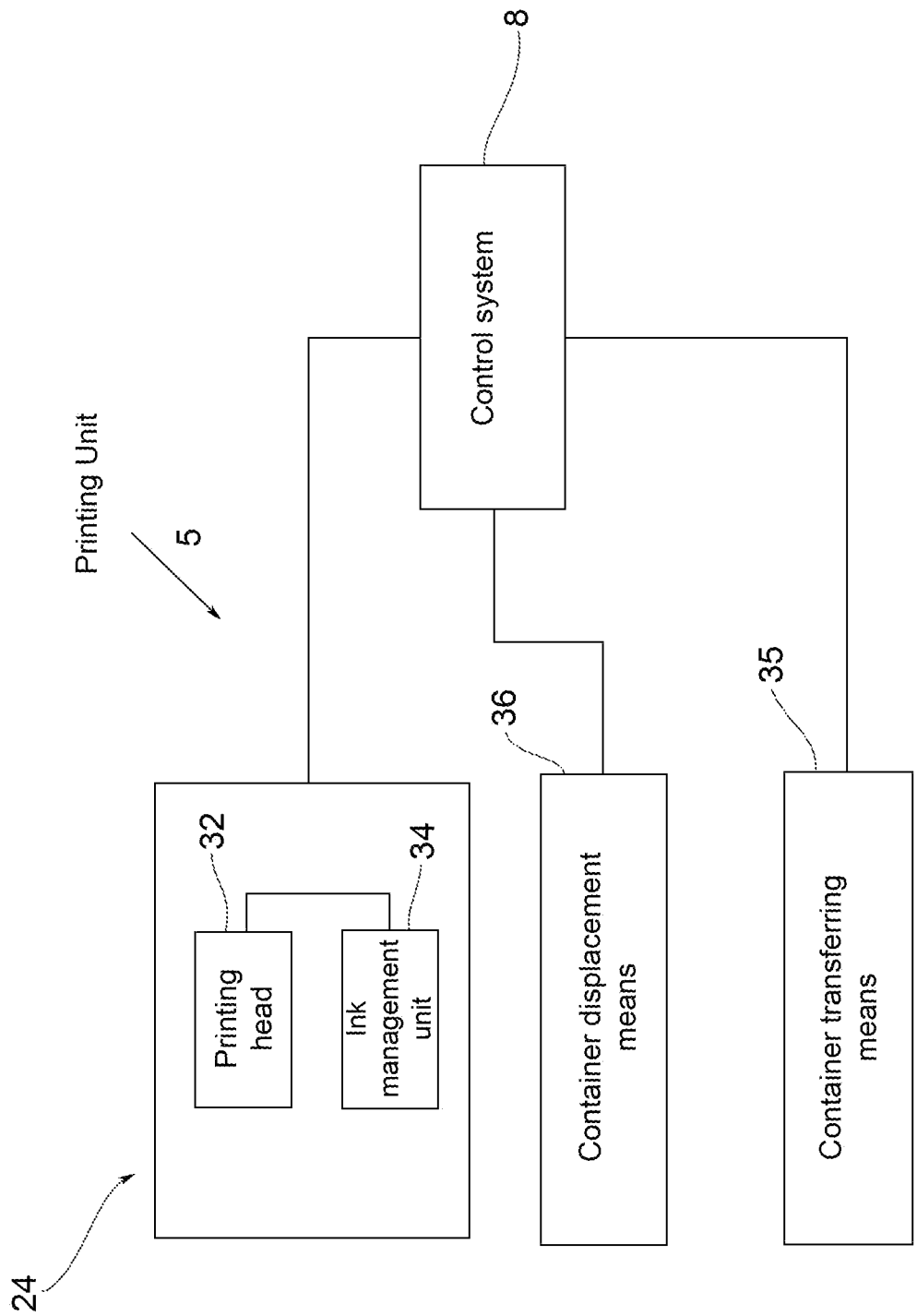
FIG. 2 shows a sketch view of a unit for printing glass containers with a unique identifier.

With reference to FIG. 2, the printing unit 5, preferably a digital printing unit, comprises an ink delivering station 24, container transferring means 35 configured for transferring the container exiting the forming station 18 to the printing unit 5, container displacement means 36 able to perform a relative rotation, translation or rotary translation to achieve specific XYZ coordinates between each container 12 and the printing unit 5 during the printing of the identifier 16, and a control system 8, operatively connected with the ink delivering station 24, the container transferring means 35 and the container displacement means 36.

The control system 8 stores at least one unique identifier for each container 12 to be applied to a respective container 12, in other words, each identifier 16 is uniquely associated to a single container 12, and the association and correspondence thereof is performed and stored in said control system 8.

In particular, the unique identifiers can be 1D, 2D barcodes or other symbologies, like for example images, which, can contain a unique identifier, Images may be made up of static images such as instructions, a logo, drug names, graduation scales, barcodes or other relevant product related data. Images can also include serial numbers, identifiers, codes, or other fixed and variable data as required to provide a container with a unique identifier, in order to deliver its traceability and track and trace functionality.

Images and unique identifiers can also be sent from an external computer system(s) and uploaded to control system 8.

Preferably, images are stored in the computer control system as a digital electronic files along with a specific matrix for each image which is applied to enable the precise placement of the ink droplets as part of the image creation process.

According to possible embodiment, images to be printed may cover the complete circumference and/or product length and height of a specific area of each container. These may be printed as singular or multi-colour images utilising either CMYK, CMYKWB, CMYKOG or solid colour process elements.

Moreover, the computerised control system 8 stores the geometry of the container 12 to be associated with each identifier 16.

The word 'geometry' must be considered in the broad sense, including both shape, size and proportions.

With reference to FIG. 2, the ink delivering station 24, comprises a printing head 32 and an ink management unit 34 configured to handle different types of ink and, particularly, those that contain heavy solids, pigments or glass frit. Preferably, the ink management unit 34 maintains the ink in a closed loop system for all the different colours being utilised for the image/identifier 16. It is also designed to ensure that the inks are maintained in suspension and to prevent evaporation of key elements of the ink system.

Preferably, the ink comprises a silicate dioxide compound and/or a boron-silicate compound.

The control system 8 and the ink management unit 34 work together to ensure that the ink is always available so that any ink or colour droplet can be delivered and printed on demand.

The printing head 32, the ink management unit 34 and the control system 8 are configured to interact in a precise manner in order to print a high definition multi-colour image on the surface of the container.

The printing head 32 is filled with ink and has a plurality of nozzles configured for spraying said ink on an external surface of each container 12.

According to a possible embodiment, the ink delivering station 24 may comprise a plurality of printing heads (not shown in the figures), each one printing a different color. In this way it is possible to print more complex marks and, moreover, it is possible to print at least one background color, by using a first color, and the real mark by using, in contrast, at least one the second color.

The configuration of the printing unit 5 depends on the container type, the image requirements and the manufacturing specifications required. The printing unit 5 may be placed as a complete single unit or as separate components within the containers manufacturing line 1. Alternatively, the printing unit 5 may also be configured as a separate unit running in parallel to the manufacturing line 1. In this case the product will be moved from the line and returned to the line once the printing process has been completed.

The container transferring means 35 can be of any type, shape and dimension and they are suitable for transferring the containers 12 exiting the forming station 18 to the container displacement means 36.

The displacement means 36 can be of any type, shape and dimension and they are suitable for holding, rotating and/or translating each container 12 and/or the printing head 12, during the printing of the identifier 16.

The displacement means 36 are operatively connected with the control system 8 to synchronize the relative movement between the printing head 32 and the container 12 with the ink-jet on the base of a control signals received from the control system 8, so as to exactly reproduce the identifier 16 in a predetermined portion of the external surface of the container 12. To this scope, the control system 8 comprises means for detecting the position of the surface of container 12 during the rotation and/or translation by the displacement means 36.

To start the printing process, the container 12 is held by the displacement means 36, whereby the computer control system 8 acquire the zero or starting position of the container. Once the starting position has been acquired, the container 12 is moved, manipulated and/or rotated by the container displacement means 36, and its actual position is continuously measured in a precise manner from the control system 8, which compares the measured actual position with a reference value of the container surface stored. If the acquired position corresponds to a position of the surface wherein an image pixel has to be printed, the control system 8 sends instructions to the printer head 32 to activate specific nozzles to provide an ink injection exactly above this container surface position.

The control system 8, the ink delivering station 24 and the displacement means 36, will continue to work in conjunction in order to control the printing head 32 as described above, until the image has been completely printed as per the artwork file stored in the control system 8.

Preferably, the printing definition is decided on the basis of the container and/or customer and/or functional requirements; the resolution may be up to 1440 dpi.

According to a possible embodiment, the printing unit 5 is provided with a cleaner device (not shown) for the printing head 32. Preferably, the cleaner device cleans the printing head 32 at predetermined time intervals so as to prevent the soiling of the printing head 32.

Depending on the container type, image requirements and the manufacturing specifications, it may be necessary to maintain the container to be printed within a specific temperature range to enhance the printing process. This can be achieved by heating or cooling the glass so that it reaches the defined temperature range.

In the glass manufacturing line 1, the printing unit 5 can be positioned near to the forming station 18 for the containers 12, e.g. upstream the forming station 18.

In this way the containers 12 exiting the forming station 18 are already pre-heated. It is also possible to pre-heat or chill the containers 12 before entering the printing unit 5 so as to control the temperature of the containers during printing process.

It should be noted that the preheating phase allows the ink to immediately fix itself to the surface of the container when it contacts the glass and, consequently, to obtain a clear improvement of the image definition. In fact, if this phase were not there, the vitrification of the ink would take place exclusively in the oven and, consequently, in the interval of time that elapses since the ink contacts the glass until the container enters the oven, the ink could deburring and compromising the definition of the image that is formed during vitrification.

Therefore, it is possible to provide the system 4 with heating and/or chilling means to set the containers in above specified range of temperature.

Certain ink systems may require an additional process to fix or cure the ink via a high temperature process. Therefore, as showed in FIG. 2, the system 4 may comprise an ink vitrification unit 6, for example an oven, furnace or annealing unit for curing the ink and to ensure it is fully bonded to the glass container. The temperature and time dependency of the vitrification process will depend on the glass type, container design, dimensions and specifications as well as the operating requirements. If the heat treatment is not part of the glass manufacturing line it will be necessary to add this as a process step during the manufacturing process.

In this way, the identifier 16 will be scratch proof and will not be damaged within the supply chain or along a drug container handling line.

Once the ink vitrification process has been completed, the container 12 with the printed unique identifier 16 will be transferred to the marked container checking unit 7.

In fact, the vitrification process could alter the ink properties and the contours/details of the identifier 16 and therefore, in order to ascertain if the image has changed or the readability has been altered, the check of the correspondence between the stored identifier 16 (in the control system 8) and the printed identifier 16 (on the external surface of the container) is performed after the annealing step by means of an identifier reader 20 (not showed in FIG. 1), which is part of the marked container checking unit 7.

Preferably, the checking unit 7 is provided with lighting means (not shown in FIG. 1), suitable for lighting the identifier 16 printed on the container 12.

In particular, if the identifier 16 is transparent or comprises empty points within the pattern, the lighting means preferably lights the container 12 from the back: in other words the light is directed toward the back of the identifier 16.

If the identifier 16 is not transparent or comprises no empty points within the pattern, the lighting means preferably light the container 12 from the front.

According to a possible embodiment, the displacement means 36 and the lighting means are operatively connected with the control system 8 to synchronize each other: therefore the relative position between the identifier reader 20 and the lighting means is adjusted in view of the type of identifier 16 and/or container 12.

If the image printed on the container surface is accepted by the checking unit 7, the marked container 12 will be accepted. If not, it will be rejected and removed from the system 4 by the selecting means 9 which are configured to discard, reject and/or block a container 12 in case of negative correspondence between the stored identifier and the printed identifier 16.

The readability and vision inspection of the marked containers 12 process may be also carried out at additional points along the manufacturing line 1, either internally or externally to deliver the process of traceability and track and trace in the supply chain or follow on manufacturing processes.

The status, readability, image, unique identifier or any other relevant parameters will be updated in the main control system 10 and stored for later usage. Any changes of status at any point in the process will be added to the existing data managed or stored so that it is possible to see a full history of the product during its lifetime. This data may be uploaded to external computer system(s).

Summarizing, the method for providing marked glass containers, preferably for pharmaceutical use, according to the present invention comprises essentially the steps of:

providing a computerised control system 8 storing at least one unique identifier 16 for each container 12, to be applied to a respective container 12, providing a printing unit 5 operatively connected with said computerised control system 8, able to print said identifier 16 on each container 12, comprising a printing head 32 filled with ink and having a plurality of nozzles configured for spraying said ink on an external surface of each container 12, providing displacement means 36 able to perform a relative rotation, translation or rotary translation between each container 12 and the printing head 32 during the printing of the identifier 16 on the container 12, said displacement means 36 being operatively connected with said computerised control system 8, printing each unique identifier 16 on each corresponding container 12 by synchronizing the printing head 32 and the displacement means 36 through said computerised control system 8.

A possible application of the present invention relates to the pharmaceutical industry.

Figure 3:
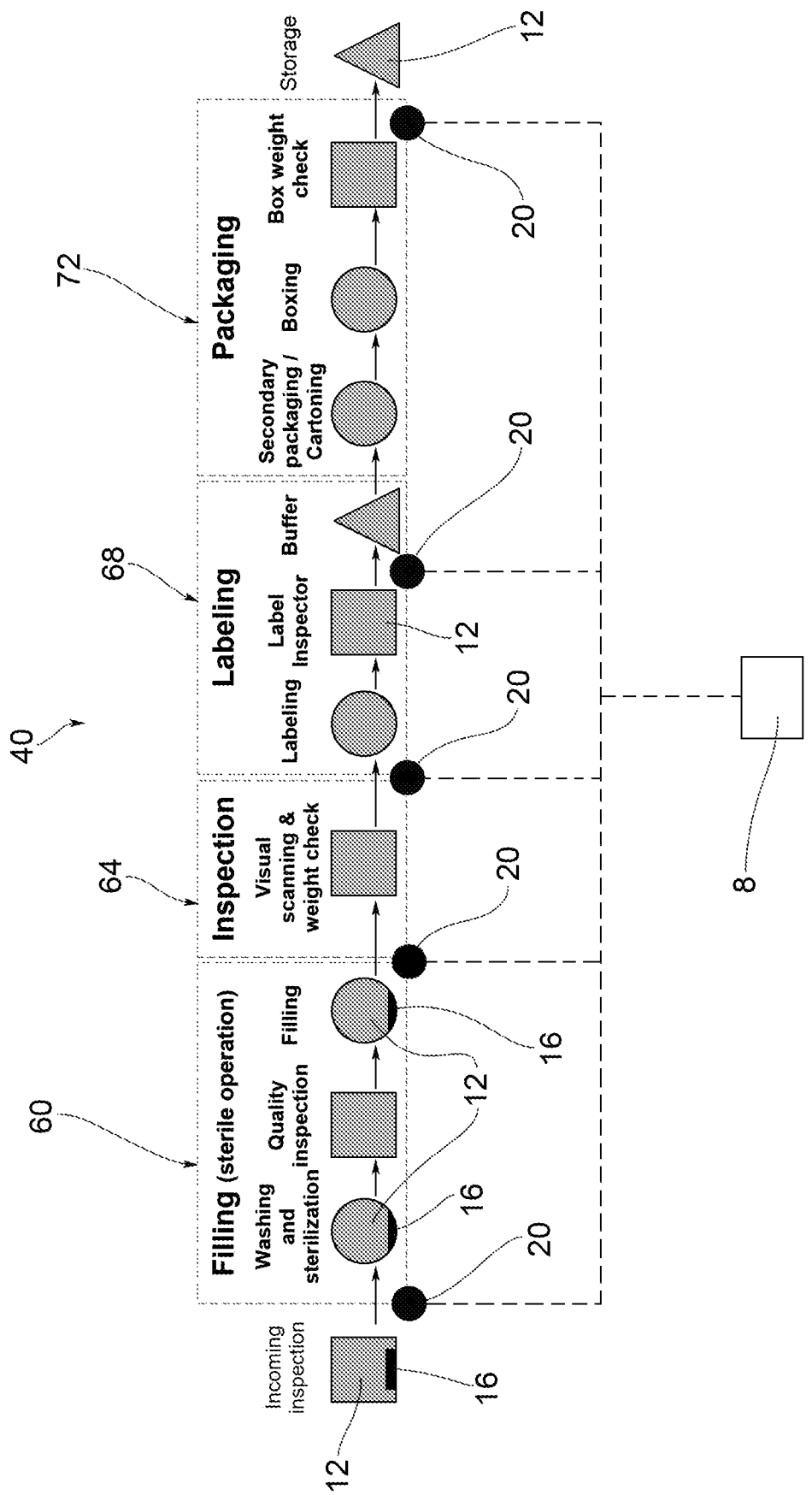
FIG. 3 shows a sketch view of an application of the marked containers for pharmaceutical use according to the system of the present invention, in a drug containers handling line.

In particular, according to a possible embodiment (as shown in FIG. 3), the marked containers 12 as manufactured in the glass manufacturing line 1 and marked by means of the system 4, can be used in a drug handling line 40 comprising, for example, a drug filling station 60 able to fill said containers 12 with a drug, wherein at least one identifier reader 20 is placed upstream the filling station 60 of the containers 12, in order to check the identifier correspondence of empty containers 12 before being filled with drug.

According to a possible embodiment, at least one identifier reader 20 is placed upstream the filling station 60 of the containers 12, in order to check the identifier correspondence of empty containers 12 before being filled with drug.

In this way it is possible to discard/block a container along the line before it is filled with drug.

According to a possible embodiment, the drug container handling line 4 comprises an inspection line having an inspection station 64.

For example, after the filling station 24 an inspection station 64 may be provided so as to perform a visual scanning and weight check of the filled container 12.

Preferably at least one identifier reader 20 is positioned in correspondence of said inspection station 64.

For example after the inspection station 64 a labelling station 68 may be provided, in order to apply a label on each container 12.

Preferably, at least one identifier reader 20 is positioned in correspondence of said labelling station 68.

According to an embodiment, after the labelling station 68, a packaging station 72 is provided in order to pack each container 12 and finally weight each box containing a container 12.

Preferably, at least one identifier reader 20 is positioned in correspondence of said packaging station 72.

According to another embodiment of the present invention, it is possible to provide a handling line having an inspection line separated from the filling line; therefore the inspection line can comprise an inspection station 64 only, with no filling station 60.

In this embodiment, it is possible to perform the reconciliation process to a drug containers inspection line only.

As it can be inferred from the description, the system according to the invention overcomes the drawbacks mentioned with reference to the cited prior art.

In fact it is possible, in real time, to mark each cylindrical glass container with a different mark containing all the necessary information, in a very fast, precise and reliable way by using existing digital printing systems without delaying the glass containers manufacturing line 1.

The printing of the containers can be performed by specific digital ink-jet printers using ink containing a silicate dioxide compound and/or a boron-silicate compound.

In fact, glass has silicon in it, so above specified ink cab be applied both on soda lime glass and borosilicate glass.

Both compounds are able to withstand a high temperature heat treatment, in other words the annealing of the glass containers which is also necessary to fix the ink to the glass. So the glass is strengthen and the ink mark is completely fixed to the glass with no risk of abrasion or partial deletion of the mark. In fact, a partial deletion or abrasion of the mark would take to a wrong or negative identification and to the consequent discard of the container from the line.

The invention claimed is:

1. A glass container manufacturing line comprising:
a forming station for forming glass containers; and
a marking system for providing marked glass containers, wherein the glass containers are transferred to the marking system when exiting the forming station, wherein the marking system comprises:
 a computerised control system storing at least one unique identifier for each container, to be applied to a respective container;
 a printing unit comprising an ink delivery station, operatively connected with said computerised control system, able to print said identifier on each container, comprising a printing head configured for spraying said ink on an external surface of each container;
 displacement means able to perform a relative rotation, translation or rotary translation between each container and the printing head during the printing of the identifier on the container, said displacement means being operatively connected with said computerised control system; and
 glass heating means in between the forming station and the printing unit for pre-heating the glass containers, wherein the forming station is positioned near the printing unit so that the glass containers exiting the forming station are pre-heated by the glass heating means when exiting the forming station and before entering the printing unit.

2. The glass container manufacturing line according to claim 1, wherein the ink comprises a silicate dioxide compound and/or a boron-silicate.

3. The glass container manufacturing line according to claim 1, wherein the ink delivering station comprises a plurality of printing heads, each one printing a different color.

4. The glass container manufacturing line according to claim 1, wherein the printing station is provided with a cleaner device for the printing head.

5. The glass container manufacturing line according to claim 1, wherein the printing unit is placed within the containers manufacturing line, between working stations of the containers manufacturing line.

6. The glass container manufacturing line according to claim 1, wherein the printing unit is placed outside the containers manufacturing line, adjacent to stations of the containers manufacturing line but outside them.

7. The glass container manufacturing line according to claim 1, wherein the containers are glass containers which are pre-heated before being printed by the printing head.

8. The glass container manufacturing line according to claim 1, wherein the displacement means are operatively connected with said computerised control system so as to synchronize the relative movement between the printing head and the container with the ink-jet, so as to exactly reproduce the identifier on the external surface of the container.

9. The glass container manufacturing line according to claim 1, wherein the computerised control system stores the geometry of the container to be associated with each identifier, in order to synchronize the relative movement between the printing head and the container in view of the geometry of the container.

10. The glass container manufacturing line according to claim 9, comprising:
 at least one identifier reader able to read the identifier printed on each container, the identifier reader being connected with said control system for comparing the identifier printed in each container with the correspondent unique identifier stored for each container,
 a selecting unit able to discard, reject and/or block a container in case of negative correspondence between the printed identifier and the stored identifier for each container.

11. The glass container manufacturing line according to claim 10, wherein the system is provided with lighting means suitable for lighting the identifier printed on the container during the reading of the identifier by the identifier reader.

12. The glass container manufacturing line according to claim 11, wherein the displacement means and the lighting means are operatively connected with said computerised control system to synchronize each other, so that the relative position between the identifier reader and the lighting means is adjusted in view of the type of identifier and/or container.

13. The glass container manufacturing line according to claim 1, comprising an ink vitrification unit having an oven, furnace or annealing unit for curing the ink and ensure it is fully bonded to the glass container, wherein an identifier reader is placed after the ink vitrification unit, in order to read the identifier printed on each container after its annealing.

\* \* \* \* \*